(12) United States Patent
Gierer et al.

(10) Patent No.: US 8,070,636 B2
(45) Date of Patent: Dec. 6, 2011

(54) ELECTROHYDRAULIC CONTROL DEVICE OF A GEAR UNIT

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 695 days.

(21) Appl. No.: 12/257,530

(22) Filed: Oct. 24, 2008

(65) Prior Publication Data

US 2009/0111636 A1 Apr. 30, 2009

(30) Foreign Application Priority Data

Oct. 24, 2007 (DE) .................. 10 2007 000 561

(51) Int. Cl.
*F16H 61/12* (2010.01)
(52) U.S. Cl. ....................................... 475/119
(58) Field of Classification Search .................. 475/119, 475/133; 477/906
See application file for complete search history.

(56) References Cited

U.S. PATENT DOCUMENTS

| | | | | |
|---|---|---|---|---|
| 4,887,491 A * | 12/1989 | Holbrook et al. | ............... | 477/34 |
| 5,591,096 A * | 1/1997 | Wagner et al. | ............... | 475/119 |
| 6,299,560 B1 * | 10/2001 | Fujioka et al. | ............... | 475/119 |
| 6,520,881 B1 * | 2/2003 | Long et al. | ............... | 475/119 |
| 6,527,670 B1 | 3/2003 | Gierer et al. | | |
| 6,544,139 B1 * | 4/2003 | Gierer et al. | ............... | 475/119 |
| 7,140,993 B2 * | 11/2006 | Long et al. | ............... | 475/119 |
| 7,175,556 B2 * | 2/2007 | Morise et al. | ............... | 475/119 |
| 7,320,657 B2 | 1/2008 | Nozaki et al. | | |
| 7,611,434 B2 * | 11/2009 | Fukushima et al. | ............... | 475/119 |
| 2007/0015624 A1 | 1/2007 | Ota et al. | | |

FOREIGN PATENT DOCUMENTS

| | | |
|---|---|---|
| DE | 198 58 543 A1 | 6/2000 |
| DE | 10 2005 012 586 A1 | 9/2006 |
| DE | 10 2006 000 334 A1 | 1/2007 |
| DE | 10 2006 014 947 A1 | 10/2007 |
| DE | 10 2006 036 565 A1 | 3/2008 |

\* cited by examiner

*Primary Examiner* — Sherry Estremsky
(74) *Attorney, Agent, or Firm* — Davis & Bujold P.L.L.C.

(57) ABSTRACT

An electrohydraulic control device (1) of an 8-speed transmission having several electrically controllable pressure control valves (6-12) for hydraulically actuating five switching elements (A-E) and an electric gear control unit via which different operating states of the transmission may be adjusted. Three of the switching elements are connected in the force flow of the transmission for representing a gear ratio ("1" to "R") of the transmission. When the gear control unit is deactivated and the power supply to the solenoid valve and pressure control valves is interrupted, and when the transmission is in the operating state, in which a gear ratio ("1"; "2"; "3"; "4"; "5"; "6"; "7"; "8"; "R") is engaged, a predefined emergency transmission ("6"; "R") is represented by three simultaneously hydraulically connected switching elements (C, D, E, A, B, D).

17 Claims, 3 Drawing Sheets

|   | A | B | C | D | E |
|---|---|---|---|---|---|
| "POS P" | • |   |   |   |   |
| "POS R", "R" | • | • |   | • |   |
| "POS N" | • | • |   |   |   |
| "1" | • | • | • |   |   |
| "2" | • | • |   |   | • |
| "3" |   | • | • |   | • |
| "4" |   | • |   | • | • |
| "5" |   | • | • | • |   |
| "6" |   | • | • | • | • |
| "7" | • |   | • | • |   |
| "8" | • |   |   | • | • |

Fig. 3

ELECTROHYDRAULIC CONTROL DEVICE OF A GEAR UNIT

This application claims priority from German Application Serial No. 10 2007 000 561.1 filed Oct. 24, 2007.

FIELD OF THE INVENTION

The present invention relates to an electrohydraulic control device of a gear unit for a motor vehicle.

BACKGROUND OF THE INVENTION

An electrohydraulic gear control device has been known from DE 10 2005 012 586 A1. The electrohydraulic gear control device is designed with an electric gear control unit and several pressure control valves, which are electrically controllable thereby, as well as several pressure regulating valves and switching valves, acted on by a hydraulic pilot pressure supplied by pressure control valves, such that gear switching elements may be controlled by way of the control pressure required for representing the respective operating state. Moreover, an emergency gear shifting valve is provided, which is located in the first shift position, when the gear control unit is activated, in which the respective switching elements connectable to the force flow for representing the required operating state of the transmission may be correspondingly connected and is located in the second shift position, when the gear control unit is de-activated, in which the respective switching elements connectable for representing an emergency transmission associated with the transmission area, are controllable by way of the control pressure required for this purpose. In addition, a selective switching valve is provided which interacts with the emergency gear shifting valve such that the emergency transmission associated with the transmission area is engaged.

The above-described electrohydraulic gear control unit is provided to operate 6-gear transmissions in which the different forward drive and reverse drive gear ratios are respectively represented by exposing two switching elements to pressure each time. Furthermore, by simultaneously connecting two switching elements, an emergency transmission is also provided, which may be engaged via an entirely hydraulic connection in case of a failure of the electric gear control unit, during which the corresponding valve devices are not energized.

It is the object of the present invention to further develop an electrohydraulic control device known from prior art, such that vehicle availability is guaranteed in case of a failure of an electric gear control unit in a simple and cost-effective manner even with an 8-speed transmission.

According to the present invention, this object is attained by way of an electrohydraulic control device of an 8-speed transmission

SUMMARY OF THE INVENTION

In an electrohydraulic control device of an 8-speed transmission of a motor vehicle comprising several electrically controllable pressure control valves for the hydraulic operation of five switching elements and an electric gear control unit, via which different operating states of the 8-speed transmission may be adjusted, three of the switching elements should be connected in the force flow of the gear control unit for representing a gear ratio of the 8-speed transmission.

According to the present invention, a predefined emergency transmission with the gear control unit de-activated and in the presence of an operating state of the 8-speed transmission in which a gear is also engaged in the 8-speed transmission is represented by three simultaneously connected switching elements.

The electrohydraulic control device embodies an electrohydraulic system which is provided for controlling an 8-speed transmission designed as an automatic transmission. For representing a forward drive or reverse drive gear ratio in the 8-speed transmission, three switching elements should respectively be placed and/or kept in an engaged state. In case of a failure of the electric gear control unit, three switching elements are connected entirely hydraulically, maintaining a force flow in the 8-speed transmission and/or further preserving the driver's gear shift preselection and those that define the emergency transmission in the 8-speed transmission.

It is thereby preferably provided that all gear changes, which are each executed by a disconnecting and a connecting switching element, may be executed even when the electric gear control unit is de-activated on the basis of the gear ratio engaged in the direction of the emergency transmission with gear control unit activated.

In the electrohydraulic gear control unit according to the present invention, the solenoid valve and pressure control valves are disconnected from the power supply when the electric gear control unit is de-activated and the switching elements are exposed to hydraulic pressure, such that the predefined emergency transmission is represented by three switching elements simultaneously connected to the force flow. It is thus achieved that even without power supply to the pressure control valves, the switching elements are exposed to hydraulic pressure for representing a gear ratio in the 8-speed transmission and preserve the vehicle availability.

BRIEF DESCRIPTION OF THE DRAWINGS

The invention will now be described, by way of example, with reference to the accompanying drawings the description of the different exemplary embodiments, the components identical in construction and function carry the same reference numerals for the sake of clarity. The drawings show.

DETAILED DESCRIPTION OF THE INVENTION

Figure 1:
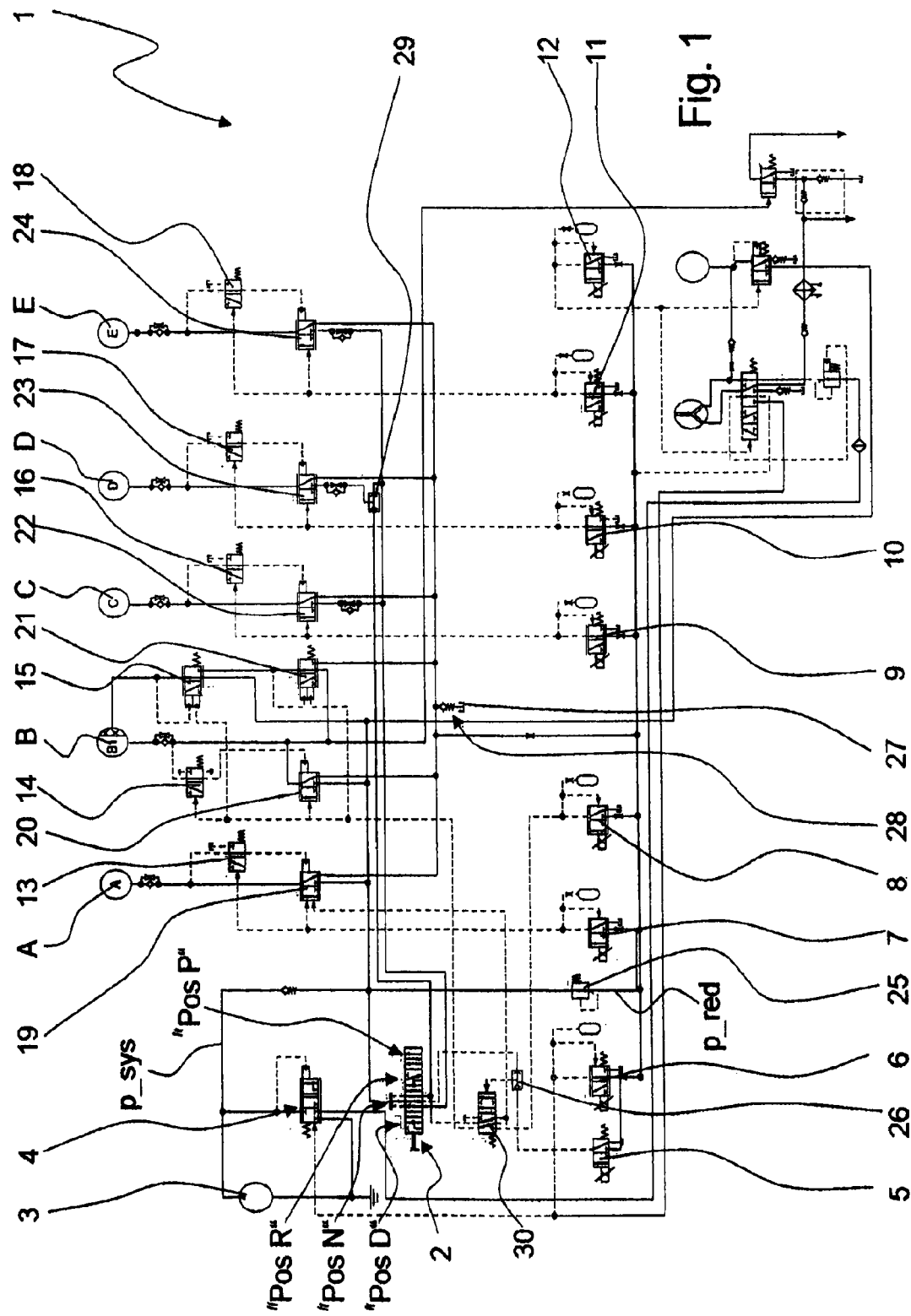
FIG. 1 a simplified hydraulic control diagram of the electrohydraulic control device of an 8-speed transmission with a manual gearshift, according to the present invention.
Figure 2:
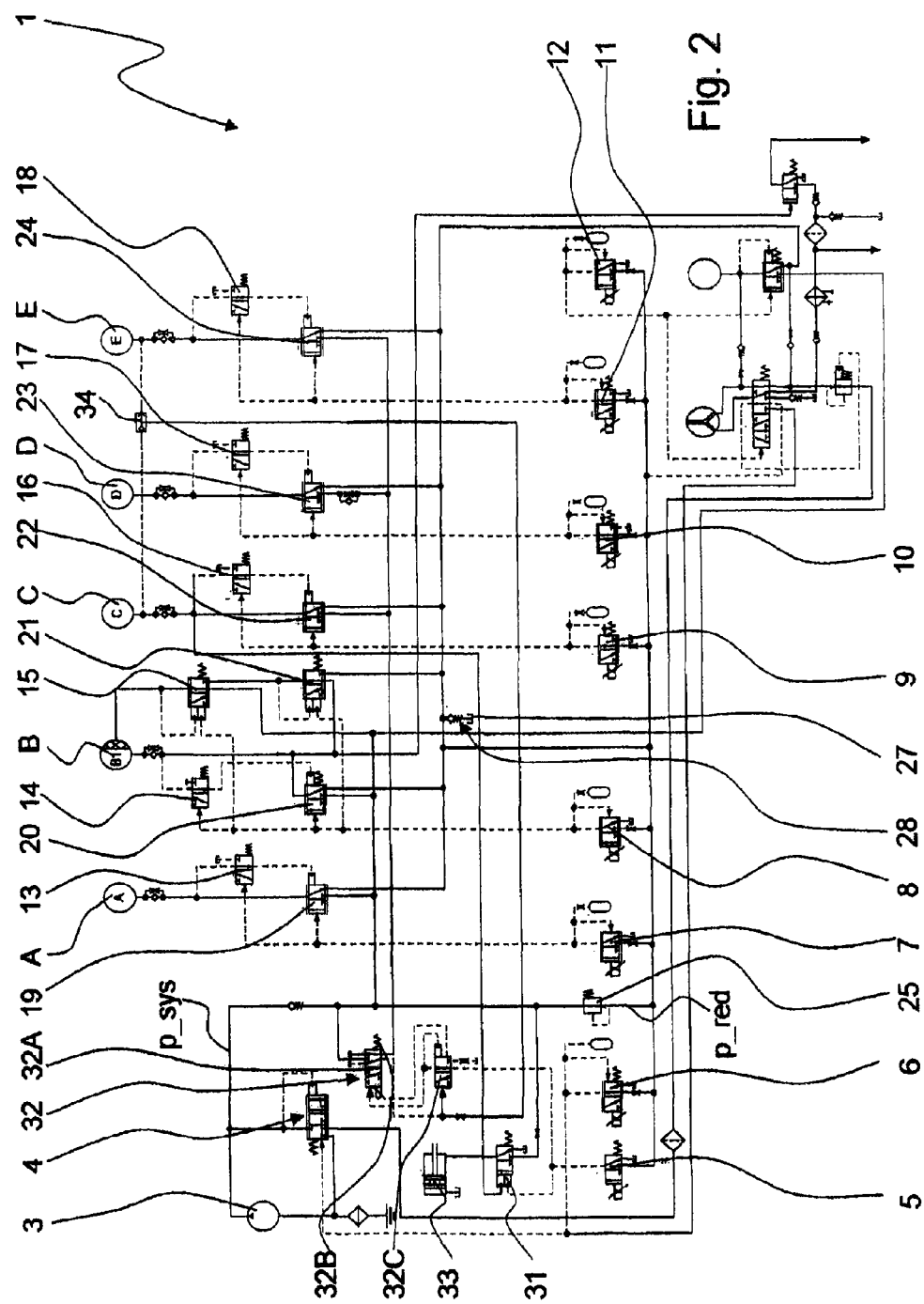
FIG. 2 a simplified hydraulic control diagram of a second embodiment of the electrohydraulic control device of an 8-speed transmission with an electric gearshift, according to the present invention, and FIG. 3 a logic diagram of the 8-speed transmission with five switching elements, three of the switching elements being respectively connected to a force flow of the 8-speed transmission for representing a gear ratio.

FIG. 1 and FIG. 2 each show a hydraulic control diagram of an electrohydraulic control device 1, which is provided for the operation of a gear unit (not illustrated in detail) configured as an 8-speed transmission. According to the gear shift logic illustrated in FIG. 3, eight gear ratios, "1", "2", "3", "4", "5", "6", "7" and "8", may be represented for forward driving and one gear ratio "R", for reverse driving by respectively connecting or disconnecting five switching elements A, B, C, D and E.

Figure 3:
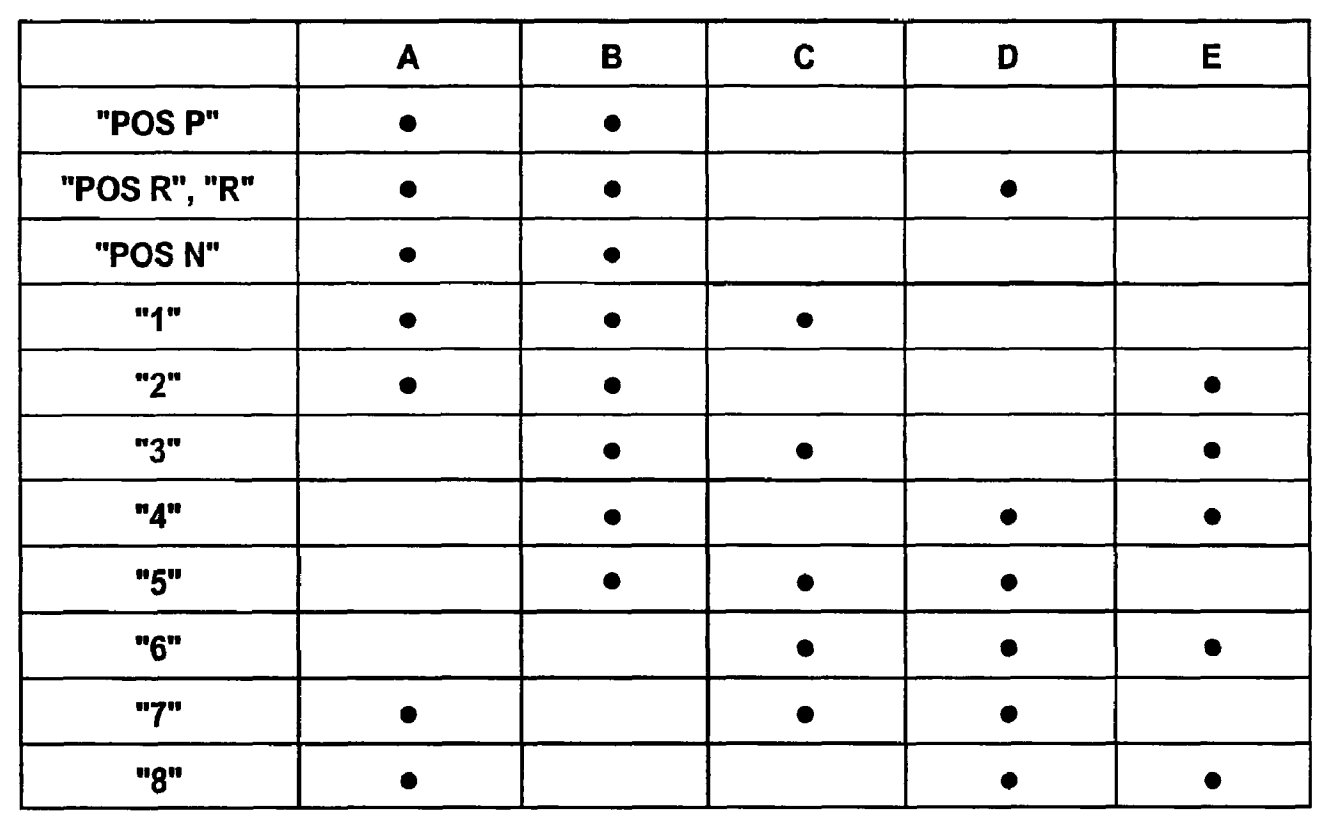

It can be seen from the gear shift logic according to FIG. 3 that three of the switching elements A to E are simultaneously connected in the force flow of the 8-speed transmission and represent the different gear ratios "1" to "8". In order to represent the gear ratios "1" and "2", the switching elements A and B are each connected in combination with the switching elements C or E, in the force flow of the 8-speed transmission. In the illustration according to FIG. 3, the switching elements A to E, which are connected in the force flow of the 8-speed transmission for representing the respective operating state, are identified by a dot, while each of the empty cells of the gear shift logic identifies the switching elements A to E which are disconnected and/or in a completely disengaged state.

In the electrohydraulic control device 1 illustrated in FIG. 1, the gear ratio to be respectively engaged in the 8-speed transmission is engaged according to a driver's gear shift preselection that may be realized hydraulically via a selector slide 2, as well as according to different shift strategies, which are released in an electric gear control unit (not illustrated in detail) in the drawing.

The selector slide 2 is adjustable to different positions "Pos D", "Pos P", "Pos N" and "Pos R" of the gearshift lever; the gear ratios "1" to "8" being engageable in the gearshift position "Pos D" for forward driving in the 8-speed transmission. In the second gearshift position "Pos N", the force flow of the drive train of a motor vehicle is interrupted in the area of the 8-speed transmission and essentially no drive torque is transferred from the gear reduction in the direction of the main engine or in the opposite direction via the 8-speed transmission.

In the third selector lever position "Pos R", the gear ratio "R" is engaged in the 8-speed transmission for reverse driving, while a mechanical parking lock is engaged in the fourth selector lever "Pos P" and the drive output of the motor vehicle is limited in a known rotationally fixed manner.

For representing a hydraulic pressure in the hydraulic piping system of the electrohydraulic control device 1, a main transmission pump 3 is provided, via which in combination with a valve device 4, arranged downstream of the main transmission pump 3 in a known way, hereinafter designated as system pressure valve and configured as pressure limiting valve, a system pressure p_sys, required for operating the switching elements A to E, may be supplied.

Furthermore, the electrohydraulic control device 1 includes a solenoid valve 5 and several pressure control valves 6 to 12, which are electrically controllable via the gear control unit, according to their configuration, are disengaged or engaged in the energized state. In this case, the pressure control valves 7 to 11 are each specifically associated with a switching element A, B, C, D, E of the 8-speed transmission.

The system pressure p_sys may be modulated by way of the pressure control valve 6, when the gear control unit is activated. In addition, the pressure control valve 6 is completely open in the de-energized state so that the system pressure p_sys is at its maximum. In the energized state of the pressure control valve 6, the system pressure p_sys is adjusted according to the electric control requirements of the electric control device for the pressure control valve 6.

Furthermore, the electrohydraulic control device 1 comprises several valve devices 13 to 18 configured as switching valves, as well as several valve devices 19 to 24 configured as pressure regulating valves. A valve device 25 is provided downstream of the system pressure valve 4 configured as a pressure reduction valve, hereinafter designated as reduction valve, via which a reduction pressure "p_red" supplied to the solenoid valve 5 and to the pressure regulating valves 6 to 12 is adjusted in a regulated manner.

When the electric gear control unit is activated, the reduction pressure and/or control pressure p_red respectively at the solenoid valve 5 and the pressure control valves 6 to 12 is supplied to the system pressure valve 4, appropriately converted depending on the power of the pressure control valves 6 to 12, the switching valves 14 to 18 and the pressure regulating valves 19 to 24 of the electrohydraulic control device 1 as a pilot pressure.

Additionally, the electrohydraulic control device 1 comprises a shuttle valve 26, which has two inbound pipes and one outbound pipe. The inbound pipe is respectively connected via the shuttle valve 26 to the outbound pipe in which the higher hydraulic pressure is available. Moreover, a pressure limiting valve 28, configured as a plate valve, is arranged downstream of the reduction valve 25 between the reduction valve 25 and an oil sump 27, such that a prefill pressure, which is preferably in the range of 0.25 bar, is preserved in the hydraulic system of the electrohydraulic control device to prevent air from entering the hydraulic piping system of the electrohydraulic control device 1.

The pressure control valves 5 to 12, as well as the switching elements A to E are controlled, depending on a driver-side engaged gearshift position "Pos D", "Pos P", "Pos N" and "Pos R" of the selector slide 2, in order to execute the respectively requested operating state of the 8-speed transmission. Thus, when the first gear ratio "1" is requested for forward driving subject to the power supply to the pressure control valve 7, the control pressure p_red adjusted via the reduction valve 25 is applied in a correspondingly converted form to the switching valve 13 and to the pressure regulating valve 19, which are associated with the switching element A and only have two switching positions.

The pressure control valve 7 is thereby energized by the electric gear control unit, such that the switching valve 13 and the pressure regulating valve 19 are each subjected to the corresponding pilot pressure, and the system pressure p_sys at the pressure regulating valve 19 via the selector slide 2 is conveyed as control pressure to the switching element A in a manner required for connecting the switching element A in the force flow of the 8-speed transmission.

At the same time, the pressure control valve 8, which in the de-energized state is likewise closed, is electrically actuated at the level required for connecting the switching element B so that the reduction pressure p_red is adjusted to the pilot pressure required for this purpose, and the switching valves 14, 15, as well as the pressure regulating valves 20, 21, are subjected to the pilot pressure required for connecting the switching element B. This procedure results in that the system pressure p_sys at pressure regulating valve 20 is present at the switching element B as a control pressure at the level required for connecting the switching element B.

In addition, the pressure control valve 9, which is also open in the energized state, is electrically controlled by the electric gear control unit at the level required for connecting the switching element C, such that the control pressure "p_red" is adapted to the pilot pressure required for this purpose and the switching valve 16, as well as the pressure regulating valve 22, are controlled by the pilot pressure. This control causes the system pressure p_sys, which is present, to be directed to the switching element C appropriately converted as control pressure, and is available there in the amount required for connecting switching element C.

In case of an error in the electric gear control unit, the power supply on the side of the gear control unit to the solenoid valve 5, as well as to the pressure control valves 6 to 12, is interrupted as a result of which the solenoid valve 5 and the pressure control valves 7, 8 and 12 are completely closed and the pressure control valves 6 and 9 to 11 are completely open.

By way of the electrohydraulic control device 1 illustrated in FIG. 1, which is designed with the manual selector slide 2, all driving positions and/or gearshift positions selected by the driver are converted hydraulically even with a failure of the electric gear control unit. Thus, even with a failure of the electric gear control unit, two switching element combinations may be represented via the selector slide 2, in which three switching elements A to E are still connected in the force flow of the 8-speed transmission, while the other two switching elements are disengaged.

In this way, when the gearshift position "Pos D" is engaged, it is possible to engage one of the gear ratios "1" to "8" for forward driving in the 8-speed transmission in a simple manner. In the exemplary embodiment depicted, in case of a failure of the electric gear control unit and engaged gearshift position "Pos D" in the 8-speed transmission, the sixth gear ratio "6" is engaged for forward driving independently of which of the gear ratios "1" to "8" is engaged when the electric gear control unit is activated.

With the sixth gear ratio "6", the maximum vehicle speed may be represented, as a result of which high vehicle availability is provided in case of a failure of the electric gear control unit. Moreover, high driving safety is thus guaranteed, since braking triggered by a sudden failure of the electric gear control unit, which is caused by engaging an excessively high gear ratio in the 8-speed transmission at an excessively high vehicle speed, is avoided.

The sixth gear ratio "6" is engaged as an emergency transmission in the 8-speed transmission via the switching elements C, D and E simultaneously connected and/or represented in the engaged state when the electric gear unit is de-activated. For this purpose, the switching elements C, D and E are supplied with hydraulic pressure and/or with the system pressure p_sys in the gearshift position "Pos D" via the selector slide 2. The proportional valves and/or switching valves 16, 17 and 18 associated with the switching elements C, D and E, as well as the pressure regulating valves 22, 23 and 24 likewise associated with the switching elements C, D and E, are kept in their completely displaced shift positions such that the system pressure p_sys is respectively transferred as control pressure to the connectable switching elements C, D and E.

The pressure supply to the switching element D starts at the selector slide 2 via a further shuttle valve 29. The hydraulic pressure required for operating the switching elements D is transferred from the system pressure valve 4 in gearshift position "Pos D" via the selector slide 2 to the shuttle valve 29 and correspondingly transferred in the area of the completely displaced pressure regulating valve 23.

In case of a de-activation and/or failure of the electric gear control unit, the reverse gear "R" is engaged in the 8-speed transmission designed with the electrohydraulic control device 1 according to FIG. 1 and/or the gearshift position is in "Pos R", the switching elements A, B and D are actuated via the electrohydraulic control device 1 purely hydraulically and the gear ratio "R" is engaged for reverse driving.

This ensures that when the selector lever position "Pos R" is engaged and there is a failure of the electric gear control unit, the switching elements A, B and D are connected to the force flow of the 8-speed transmission purely hydraulically and the reverse gear and/or the gear ratio is engaged in the 8-gear transmission. Only the switching elements A, B and D required for representing the emergency transmission selected as reverse driving gear ratio "R" are then supplied with the control pressure required for this purpose. For this, the switching element D is supplied with the selector slide pressure and/or system pressure p_sys conveyed via the selector slide 2 in the gearshift position "Pos R", while the switching elements A and B are directly exposed to the system pressure p_sys by the system pressure valve 4.

As both pressure control valves 7 and 8 are closed when the electric gear control unit is de-activated and/or in the de-energized state, the reduction pressure p_red in the area of the pressure control valves 7 and 8 is not transferred in the direction of the switching valves 13, 14 and 15 or of the pressure regulating valves 19, 20 and 21. In order to still convey the system pressure p_sys in the area of the valve devices 13, 14, 15, 19, 20 and 21 in the direction of the switching elements A and B, a further switching valve 30 is provided, which is neither subjected to pilot pressure by the solenoid valve 5 nor via the selector slide 2, when the electric gear control unit is de-activated and is therefore placed in the shift position illustrated in FIG. 1, in which the adjacent system pressure p_sys is transferred in the direction of the switching valves 14 and 15 as well as in the direction of the pressure regulating valves 19 to 21 via the selector slide 2. Thus, the switching elements A and B are subjected to their control pressure and connected in addition to the switching element D, while the switching elements C and E are disengaged.

When the electric gear control unit is de-activated, the additional switching valve 30 is exposed to pilot pressure by the solenoid valve 5 and kept in the disconnected position in which the system pressure p_sys on the additional switching valve 30 is not transferred in the direction of the pressure regulating valves 19 to 21, when the gearshift in position "Pos R" is engaged. This ensures that the switching elements A and B are only subjected to control pressure in dependence upon the power supply to the pressure control valves 7 and 8 and that the reverse gear is not unintentionally engaged.

Thus with an active gear control unit the additional switching valve 30 is actuated via the pressure of the solenoid valve 5, when a vehicle speed and/or gear reduction speed or a speed of the 8-speed transmission does not permit the engagement of the reverse gear "R", as a result of which the additional switching valve 30 acts as a reverse gear protection.

FIG. 2 shows the hydraulic control diagram of a second embodiment of the electrohydraulic control device 1, which is coupled to an electric selector lever and by way of which the switching logic of the 8-speed transmission illustrated in FIG. 3 is likewise realizable when the gear control unit is activated. The electrohydraulic control device 1 according to FIG. 2 only differs from the electrohydraulic control device 1 according to FIG. 1 in certain sections, the reason for the differences are essentially focused on in the description below.

The electrohydraulic control device 1 according to FIG. 2 is designed with a valve device 31, hereinafter designated as parking lock valve, as well as with a further valve device 32, hereinafter designated as position valve. A mechanical parking lock device is actuated via the parking lock valve 31 interacting with a parking lock cylinder 33 in a known way.

In the present description, when the electric gear control unit is activated, the position valve 32 is subjected to a pilot pressure by the solenoid valve 5 and arranged downstream of the system pressure valve 4. In the shift position of the position valve 32 illustrated in FIG. 2, the system pressure p_sys is conveyed in the direction of the pressure regulating valves 22, 23 and 24 via the position valve 32. The pressure regulating valves 19 and 20 are directly connected to the system pressure valve 4 and thus subjected to the system pressure p_sys independently of the shift position of the position valve 32.

In the active operating state of the electric gear control unit, in which the solenoid valve 5 and the pressure control valves

6 to 12 are electrically controllable by the gear control unit, the solenoid valve 5 is energized via all operating states of the 8-speed transmission except for the operating state in which the electric selector lever is in the selector lever position "Pos P". Thus, at least one main operating piston 32A of the position valve 32, which is spring-loaded by a spring device 32B in the direction of an additional operating piston 32C of the position valve 32, is kept in a shift position by the pilot pressure at the solenoid valve 5 in which the system pressure p_sys is transferred in the area of the position valve 32.

As the electrohydraulic control device 1 interacts with an electric selector lever and is configured without the manual selector slide 2 of the electrohydraulic control device 1 according to FIG. 1, the emergency transmission is only engaged in the 8-speed transmission, when during emergency operation there is a driver's request for forward driving and/or when the gearshift is in the selector position "Pos D". The parking lock is engaged in the other gearshift positions "Pos P", "Pos R" or "Pos N". The parking lock is only engaged and/or engaging if the vehicle speed of a motor vehicle is lower than a threshold speed of the vehicle.

In the engaged gearshift position "Pos D", the emergency transmission is engaged purely hydraulically in the 8-speed transmission by way of the electrohydraulic control device 1 illustrated in FIG. 2 via the simultaneously engaged switching elements C, D and E, when the electric gear control unit is de-activated. This results from the fact that the solenoid valve 5 is not de-energized and engaged in case of a failure of the electric gear control unit, while the pressure control valves 6 to 11 are in the operating states described in FIG. 1.

Since the solenoid valve 5 engages with a de-activated gear control unit, the pilot pressure holding the position valve 32 against the spring device 32B in the switched shift position decreases so that the system pressure p_sys at the position valve 32 is not switched through in the direction of the switching elements C, D and E.

To prevent it, the additional operating piston 32C of the position valve 32 is connected to the pipes conducting the control pressures of the switching elements C and E downstream of the pressure regulating valves 22 and 24 via a shuttle valve 34. This ensures that upon a failure of the electric gear control unit the position valve 32 is exposed to the control pressure of the switching element C or of the switching element E in the area of the additional operating piston and kept in the shift position that transfers the system pressure p_sys in the direction of the switching elements C to E, although the pilot pressure on the side of the solenoid valve is no longer at the position valve 32 and/or main operating piston 32A of the position valve 32. Thus, the position valve 32 has a self-latching feature, which is facilitated by a hydraulic pressure in the selector lever position "Pos D", when the electric gear control unit is activated or de-activated.

Furthermore, the parking lock valve 31 also includes a self-latching feature as it may be exposed to the control pressure of the clutch and/or switching element C engaged for representing the emergency gear ratio in the 8-speed transmission. Thus, when the emergency transmission is engaged in the 8-speed transmission, the parking lock valve 31 is kept in an operating state by way of the control pressure of the switching element C in which the parking lock remains disengaged.

In the electrohydraulic control device 1 illustrated in FIG. 1, it is possible to shift between the emergency transmission for forward driving and reverse driving and/or operate the vehicle even after stopping the power unit and/or the combustion engine and again restarting the vehicle. The parking lock has to be temporarily disengaged in the first instance via a emergency unlocking device known per se. Moreover, the parking lock is engaged when the driver engages the gearshift positions "Pos P" and "Pos N", even when the main transmission pump 3 is pumping.

In contrast, in the electrohydraulic control device 1 illustrated in FIG. 2, the emergency transmission for forward driving engages when the gearshift position "Pos D" is engaged and the gear control unit is simultaneously de-activated and remains in this emergency gear. If the engine and/or main engine of a vehicle is switched off, the pressure in the hydraulic system decreases because the main transmission pump is no longer pumping and the parking lock engages automatically. It may likewise be temporarily disengaged via a corresponding emergency unlocking device where, after switching off the main engine, the emergency transmission may no longer be engaged due to the missing selector slide 2.

| Reference numerals | |
|---|---|
| 1 | electrohydraulic control device |
| 2 | selector slide |
| 3 | main transmission pump |
| 4 | valve device, system pressure valve |
| 5 | solenoid valve |
| 6 to 12 | pressure control valve |
| 13 to 18 | valve device and/or switching valve |
| 19 to 24 | valve device and/or pressure regulating valve |
| 25 | valve device, reduction valve |
| 26 | shuttle valve |
| 27 | oil sump |
| 28 | pressure limiting valve |
| 29 | shuttle valve |
| 30 | additional shift valve |
| 31 | valve device, parking lock valve |
| 32 | valve device, position valve |
| 32A | operating position |
| 32B | spring device |
| 32C | additional operating piston |
| 33 | parking lock cylinder |
| 34 | shuttle valve |
| A to E | switching element |
| p_sys | system pressure |
| p_red | reduction pressure |
| "Pos P" | gearshift position |
| "Pos R" | gearshift position |
| "Pos N" | gearshift position |
| "Pos D" | gearshift position |
| "1" to "8" | forward driving gear ratio |
| "R" | reverse driving gear ratio |

The invention claimed is:

1. An electrohydraulic control device (1) of an 8-speed transmission of a motor vehicle having at least one solenoid valve (5) and several electrically controllable pressure control valves (6 to 12) for hydraulically actuating five switching elements (A to E) and an electric gear control unit, via which different operating states of the 8-speed transmission are adjusted, at least three of the switching elements being connected in the force flow of the gear control unit for representing a gear ratio ("1"; "2"; "3"; "4"; "5"; "6"; "7"; "8"; "R"), when the gear control device is de-activated and consequently a power supply to the solenoid valve (5) and the pressure control valves (6 to 12) is interrupted and in the presence of an operating state of the 8-speed transmission in which the gear ratio ("1"; "2"; "3"; "4"; "5"; "6"; "7"; "8"; "R") is engaged in the 8-speed transmission, a predefined emergency transmission ("6"; "R") is represented by three simultaneously entirely hydraulically connected switching elements (C, D, E; A, B, D).

2. The electrohydraulic control device according to claim 1, wherein a separate pressure control valve (6 to 11) is associated with each switching element (A to E).

3. The electrohydraulic control device according to claim 1, wherein the pressure control valves (6, 9, 10, 11) at least partially have an inversely proportional behavior with respect to a control current.

4. The electrohydraulic control device according to claim 1, wherein the pressure control valves (7, 8, 12) at least partially have a proportional behavior with respect to a control current.

5. The electrohydraulic control device according to claim 1, wherein the solenoid valve (5) is closed in a de-energized state.

6. The electrohydraulic control device according to claim 1, wherein at least a hydraulically pre-controllable pressure reduction valve (19 to 24) is provided between one of the five switching elements (A to E) and a pressure control valve (6 to 11) associated with one of the five switching elements (A to E), by way of which a hydraulic pressure signal of the pressure regulating valve (6 to 11) is translated.

7. The electrohydraulic control device according to claim 6, wherein the hydraulic pre-controllable pressure reduction valve has at least one inverse proportional valve characteristic with respect to the hydraulic signal of the associated pressure control valve.

8. The electrohydraulic control device according to claim 1, wherein the emergency transmission ("6") corresponds to a maximum vehicle speed gear ratio ("6") of the 8-speed transmission, by way of which a maximum vehicle speed of the motor vehicle accomplished with the 8-speed transmission is represented.

9. The electrohydraulic control device according to claim 1, wherein the emergency transmission ("6", "R") is disengaged by a driver with a predefined actuation of a gearshift or when a pressure, supply on a transmission pump side, is below a certain value.

10. The electrohydraulic control device according to claim 1, wherein an operating state of the 8-speed transmission of the electric control device selected by a driver with a gearshift is conveyed as an electric signal and control of a valve device (32) that hydraulically converts a driver's gear shift preselection executed via the gear control unit and the solenoid valve (5), which is operatively connected thereto, where the valve device (32), with the inactive gear control unit and the gearshift position ("Pos D") for forward driving, are kept in an operating state engaging the emergency transmission by way of a hydraulic control pressure of a switching element (C) connectable in a force flow.

11. The electrohydraulic control device according to claim 1, wherein when the gear control unit is de-activated and a gearshift is in a position ("Pos D") for forward driving, and a valve device (33) is maintained in an operating state disengaging a parking lock by way of a hydraulic control pressure.

12. The electrohydraulic control device according to claim 11, wherein when the gear control unit is de-activated and the gearshift is in a position ("Pos R") for reverse driving, the valve device (33) for a parking state ("Pos P"), during which the parking lock is engaged, or for a neutral state ("Pos N") of the 8-speed transmission, in which essentially no torque is transferred via the 8-speed transmission, and for a vehicle speed that is lower than a threshold value of the vehicle speed, is in an operating state, in which the parking lock is engagable.

13. The electrohydraulic control device according to claim 1, wherein a selector slide (2) is operatively, mechanically connected to a gearshift and features an operating state that respectively corresponds to a driver's selection related to the gearshift for representing an operating state of the gear unit, where, in the presence of a gearshift position ("Pos D") for forward driving and when the gear control unit is de-activated in an area of the selector slide (2), a hydraulic signal engaging an emergency transmission ("6") for forward driving is switched through.

14. The electrohydraulic control device according to claim 13, wherein a switching valve (30) is provided which, with a gearshift position ("Pos R") for reverse driving starting at the selector slide (2), is subjected to a hydraulic pressure and features an operating state required for representing the emergency transmission ("R") for reverse driving such that at least one switching element (A, B) connectable in the force flow for representing the emergency transmission ("R") for reverse driving is subjected to a required control pressure switched through in an area of the switching valve (30).

15. The electrohydraulic control device according to claim 14, wherein the pressure reduction valves (19, 20, 21) associated with the connectable switching elements (A, B) for representing the emergency transmission ("R") for reverse driving are subjected to the control pressure via the shift valve (30) when the electric gear control unit is de-activated.

16. The electrohydraulic control device according to claim 14, wherein the shift valve (30) is controllable by the solenoid valve (5), when the electric gear control unit is de-activated.

17. An electrohydraulic control device (1) for an 8-speed motor vehicle transmission, the control device (1) comprising:
    first, second, third, fourth and fifth hydraulically actuated gear shifting elements (A, B, C, D, E);
    at least one solenoid valve (5) and several electrically controllable pressure control valves (6 to 12) communicating with the first, the second, the third, the fourth and the fifth gear shifting elements (A, B, C, D, E) to hydraulically actuate three of the first, the second, the third, the fourth and the fifth gear shifting elements (A, B, C, D, E) to implement one of first, second, third, fourth, fifth, sixth, seventh, eighth and a reverse gear ratio ("1"; "2"; "3"; "4"; "5"; "6"; "7"; "8"; "R"); and
    a predefined emergency ratio ("6"; "R") being implemented by simultaneously, hydraulically actuating the first, the second and the third shifting elements (C, D, E; A, B, D) when one of the gear control device (1) is de-activated and a power supply to the solenoid valve (5) and the pressure control valves (6 to 12) is interrupted and when one of the first, the second, the third, the fourth, the fifth, the sixth, the seventh, the eighth and the reverse gear ratio ("1"; "2"; "3"; "4"; "5"; "6"; "7"; "8"; "R") is engaged.

* * * * *